June 7, 1960 W. P. CROPPER ET AL 2,939,313
MICRO OPEN-CUP FLASH TESTER
Filed Oct. 7, 1957 2 Sheets-Sheet 1
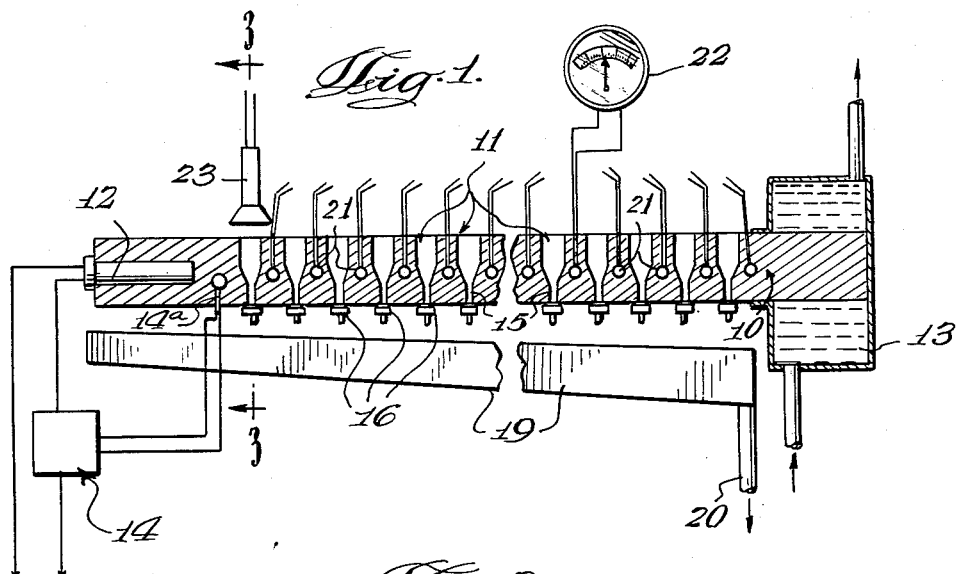
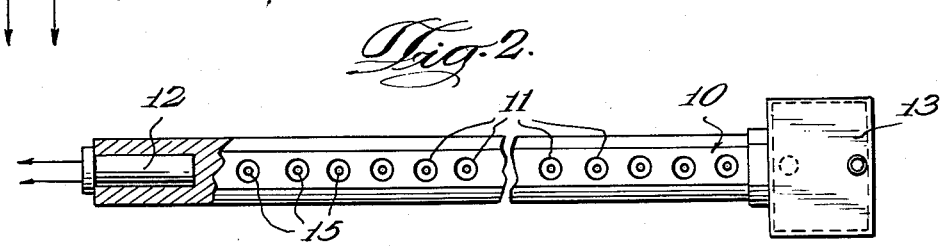
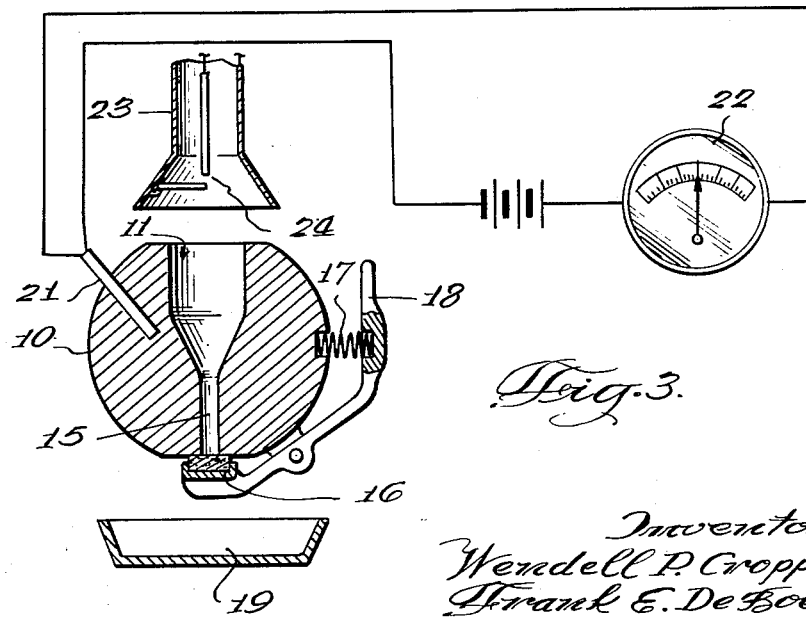
Inventors
Wendell P. Cropper
Frank E. DeBoer
By Everett A. Johnson
attorney

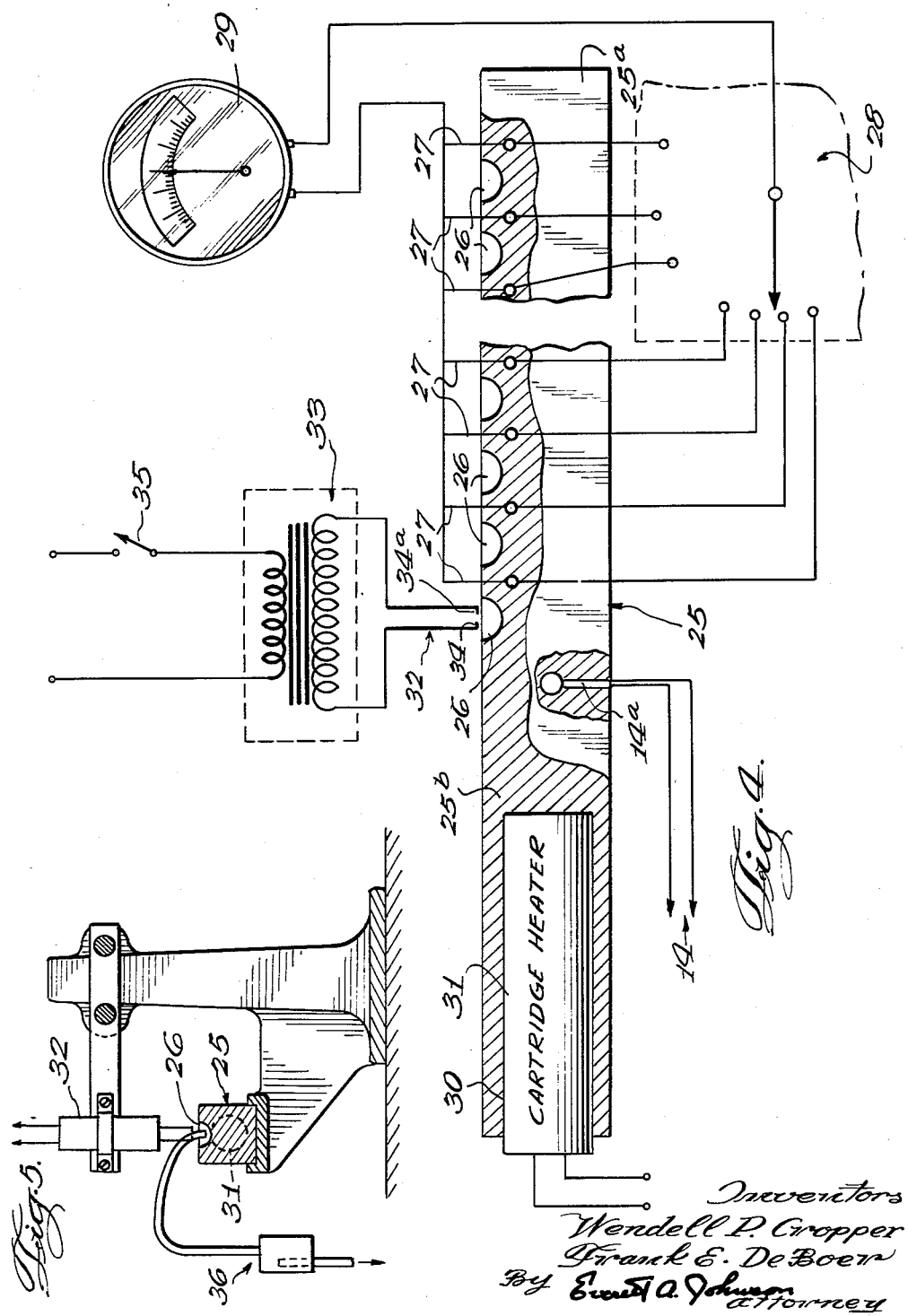

United States Patent Office 2,939,313
Patented June 7, 1960

2,939,313

MICRO OPEN-CUP FLASH TESTER

Wendell P. Cropper, Lansing, and Frank E. De Boer, Oak Park, Ill., assignors to Standard Oil Company, Chicago, Ill., a corporation of Indiana Filed Oct. 7, 1957, Ser. No. 688,491

7 Claims. (Cl. 73—36)

This invention relates to the determination of the flash point of liquids. More particularly, the invention relates to an improved apparatus for rapidly and conveniently determining and recording the flash temperature of micro samples of hydrocarbon liquids in routine laboratory analyses.

In the production of certain commercial hydrocarbon products, it is desirable to maintain a flash point within specified limits in accordance with a prescribed specification. Heretofore the flash point has been measured by one of the American Standard methods including the Tag Closed Cup, Pensky-Martens Closed Cup, and the Cleveland Open Cup. In each of these methods, a sample of substantial size is heated at a prescribed rate and a test flame of precise size is inserted periodically into the space above the heated sample. The liquid temperature at which the vapor in such space from the sample flashes is designated as the "Flash Point" of the hydrocarbon liquid under test.

The Cleveland Open Cup test is used to determine the flash points of petroleum products in the range of 200° F. to 600° F. The test takes a considerable time because of the large sample size (50 to 70 ml). Even the quickest flash point test requires substantially longer than 10 minutes per sample and when maximum accuracy is desired, the test takes even longer and about 20 minutes may be necessary. In view of the long time necessary to make the test, the large volume of sample needed, and the great care required for conducting the conventional test in determining the flash point, it had not heretofore been convenient to handle a large number of samples in the routine flash point analyses. Further, where only small amounts of sample are available, as may be the case in fuel research and development work, no system is available for rapidly and conveniently determining flash point.

In a large petroleum laboratory, 6,000 to 10,000 flash point tests per month may be conducted and it is apparent that there is considerable incentive to provide a rapid system, employing micro samples, and which is adaptable for routine quality control work.

It is, therefore, a primary object of this invention to provide a method and apparatus for determining flash point on a micro scale. It is a further object of this invention to provide a flash point determining system which has an accuracy comparable to the best of the Standard methods. A further object of the invention is to provide a flash point apparatus which is adapted for use in routine analyses of a large number of samples. It is an additional object of the invention to provide such a system which requires a substantially shorter period of time for conducting the test. A further object is to provide a reliable flash point instrument which does not require a precise measurement of the volume of the sample, is of simple and rugged construction and which does not require an operator having highly developed technical skills. These and other objects of the invention will become apparent as the description thereof proceeds.

Briefly, according to our invention, we provide an apparatus which involves a solid bar of highly heat-conductive material, the bar accommodating a plurality of shallow cups in longitudinally spaced array along the top surface of the bar. A thermal gradient is established along the length of the bar. In this way, each cup is at different temperatures, the cup having the highest temperature being nearest the heater. To establish the proper thermal gradient, we may vary the geometry of the bar, the heat-reflective properties of the bar may be controlled by insulation, fins, bright surfaces or the like, or the net heat input to the bar may be varied as by using spaced heaters of different capacity or a single heater at one end of the bar and providing cooling means at the other end of the bar. If desired, two or more of these means for controlling the net heat retention at any spaced point in the bar can be used.

Further details and advantages of our system will be described by reference to an embodiment of the invention illustrated in the accompanying drawings wherein:

Figure 1 is an elevation schematically showing the general assembly of the apparatus;

Figure 2 is a plan view of the apparatus in Figure 1;

Figure 3 is a section taken along the line 3—3 in Figure 1;

Figure 4 is a schematic illustration of another embodiment of our invention; and Figure 5 is an end view of the temperature gradient bar in Figure 4 showing associated accessories.

Referring to the drawings, the bar 10 which may be made of metal, such as brass, stainless steel, tinned copper or the like, is provided with a plurality of cups 11 having a capacity of about 1.5 cc. each. The bar 10 is heated by cartridge heater 12 and is cooled by cooling jacket 13. A suitable thermostat 14 can control the relative rates of heating by 12 and cooling by 13 so as to maintain the desired net heat input to the bar 10. In this way, each cup 11 is maintained at a different temperature, the hottest cup 11 being nearest the heater 12 and the coolest being nearest the jacket 13.

Although we prefer to retain the sample directly in the cups 11 in the bar 10, we may provide cup inserts (not shown) of high heat-conductivity.

The samples may be removed from the cups 11 after the determination of the flash point by one of several means. The sample may be withdrawn by suction, it may be discharged by rotating the bar 10 about its longitudinal axis, or we may provide drain channels 15 closed at their lower ends by the spring-loaded cap 16. By compressing spring 17 in turning the lever 18, the cap 16 is withdrawn.

A collecting trough 19 is disposed below the bar 10 and is inclined downwardly to drain 20 which discharges residual samples into a sump.

The temperature of the cups 11 is monitored by means of a plurality of thermocouples 21 peened into the bar 10 adjacent to each cup 11 and connected through appropriate electrical equipment to an indicator-recorder 22.

The flash point determination is made by noting the temperature of the thermocouple 21 located between the cup 11 that flashed and the adjacent cup that failed to flash. This temperature is correlated with the Cleveland Open Cup Flash Point. If desired, a scale (not shown) calibrated in Cleveland Flash Point may be aligned with the cups 11 for routine "go, no-go" testing.

In making a test with this equipment, several cups 11 in the vicinity of the cup in which the operator, by experience has reason to believe will be at the flash point, are filled with the liquid under test. The samples are permitted to stand for about one minute until the samples are in thermal equilibrium with the bar 10 surrounding each cup 11. Between one and two minutes after the sample has been introduced into the cup, the ignitor means 23 is moved along the bar 10 over the exposed cups 11 until a flash occurs. The ignitor means may comprise a small gas flame or a spark gap 24 as shown but in either case the spark or flame should be very small. If desired, an array of ignitor means 23 can be aligned with each cup 11 and the spark gap energized selectively or sequentially either manually or in an automatic manner.

An embodiment of the invention is illustrated by Figure 4 which is simple and well adapted for routine laboratory use. The temperature gradient bar 25 is of copper, is about one inch in cross-section and is about 20 inches long. About one inch from the cooler end 25a of the bar 25 is the first of a series of twenty-one sample cups 26. These cups are essentially hemispherical cavities about 0.375 inch in diameter, about 0.25 inch deep, and on about 0.625 inch centers.

A series of twenty Iron-Constantan thermocouples 27 is placed between the twenty-one sample cups 26 so that the junctions of the thermocouples 27 fall on a line parallel to and above the longitudinal axis of the bar 25 and at a depth in the bar 25 corresponding to the level of the bottom of the sample cups 26, i.e. about 0.25 inch from the upper surface of the bar. The thermocouples 27 are connected through a single-pole 20-position switch 28 to a broad-range temperature-indicating meter 29.

The heated end 25b of the temperature gradient bar 25 is provided with an end-chamber 30 which accommodates the 350 watt cartridge type heater 31. Means (not shown in Figure 4) for cooling the end 25a of the bar 25 may be provided as described in connection with Figure 1.

The procedure for making the flash point determinations is essentially as described with respect to Figures 1–3 inclusive. Thus the sample is placed within the cups 26, the bar 25 is heated by means of a cartridge heater 31, a sparking device 32 is placed above the cups 26 containing the sample under test, and when a flash occurs, the temperature is noted as a measure of the flash point.

The sparking device 32 comprises neon-tube transformer 33 having a 5000 volt secondary and the electrodes 34—34a providing about a 0.125 inch spark gap. A push button switch 35 in the primary circuit of the transformer 33 controls the sparking across the gap.

We may provide a series of pairs of electrodes 34—34a, one for each cup 26, and connected through a multi-position switch (not shown). However, a useful unit is provided by mounting the sparking device 32 on a carrier such as schematically shown in Figure 5 and adapted to assume an index position in alignment with a selected cup 26. When a flash occurs the temperature of the cup in question is determined by reading the temperature of the two adjacent thermocouples 27 which bracket the particular cup 26.

Samples are removed from cups 26 after a test by suction through a trapped laboratory vacuum line 36 as shown in Figure 5.

Since the range of the bar 25 is about 100° F. to 700° F. and since the approximate temperature of a given series of cups 26 will be known, only a relatively few adjacent cups 26 need be filled with a sample when the approximate flash point of the sample is already known.

From the rough estimation of the flash point and of the temperature of a given cup, it is contemplated that a temperature gradient scale may be applied to bar 25 thereby visually indicating to the operator the approximate temperature of the cup 26 in which the flash occurs.

We have found that the principles embodied in this instrument can be used to determine flash points in the broad range of 100° F. to 700° F.; it permits the inspection to be made very rapidly because of the short time taken to heat the micro sample; and its precision is at least as good as that required in the Cleveland Open Cup test in the 350° F. to 500° F. range.

Although our invention has been described with reference to particular embodiments thereof, it should be understood that these are by way of illustration only. The invention is not necessarily limited to the described embodiments since alternative components and operating techniques will become apparent to those skilled in the art in view of our foregoing disclosure. Accordingly, modifications in the construction and operation of the apparatus are contemplated without departing from the spirit of our invention.

What we claim is:

1. An apparatus useful in determining the flash point of micro samples of petroleum products which comprises a bar of highly heat-conductive material, a plurality of longitudinally spaced segregated open cups in the said bar, means for maintaining a thermal gradient between the several cups along the top of said bar, means for determining said thermal gradient, and means for subjecting to ignition any vapors evolved from said cups.

2. The apparatus of claim 1 which includes temperature-indicating means for each cup.

3. In a method for determining flash point of petroleum products the steps which comprise segregating a plurality of aliquot portions of the sample in an aligned array, maintaining temperature gradients between said segregated portions, exposing each of said segregated portions to ignition until the vapor evolved from one of said portions is ignited, and ascertaining the temperature of the portion which is at the lowest temperature at which ignition occurs as the flash point of said petroleum products.

4. An apparatus useful in determining the flash point of a heated liquid comprising an elongated bar of highly heat-conductive material, a plurality of uniformly spaced segregated sample cups in said bar, drain means from each of said cups, means for heating the bar at one end thereof, means for cooling the other end of said bar, means for indicating the resultant temperature gradient along said bar, and ignitor means mounted above said bar and adapted to be maintained in proximity to each of said cups containing a portion of a sample under test.

5. An apparatus for conducting flash point determinations in a rapid manner which comprises in combination an elongated bar of heat-conductive material, said bar having a plurality of segregated cavities, said cavities being of relatively small volume and being spaced equidistant from each other along the top of said bar, electrical means for heating one end of said bar, cooling means applied to said bar remote from said heating means, means for determining the temperature of said bar at spaced points therealong and adjacent each cavity, and ignition means adapted to be disposed above and adjacent each cavity, whereby ignition of vapors from a sample is noted and the temperature of the cavity containing the sample may be determined.

6. The apparatus of claim 5 wherein the means for determining the temperature comprises a plurality of thermocouples embedded within the said bar intermediate said segregated cavities.

7. The apparatus of claim 5 which includes suction means adapted to remove residual samples from said cavities.

References Cited in the file of this patent

UNITED STATES PATENTS

| | | |
|---|---|---|
| 1,554,993 | Ettele | Sept. 29, 1925 |
| 2,682,765 | McCutchan et al. | July 6, 1954 |